United States Patent
Hoecker et al.

(10) Patent No.: US 9,174,417 B2
(45) Date of Patent: Nov. 3, 2015

(54) HOUSING FOR ELECTRICAL POWER CELLS IN ELECTRICALLY DRIVEN AUTOMOTIVE VEHICLES

(75) Inventors: Bernd Hoecker, Wiesbaden (DE); Klaus Müller, Sulbach (DE); Ines Schwarz, Frankfurt (DE)

(73) Assignee: Basell Polyolefine GmbH, Wesseling (DE)

( * ) Notice: Subject to any disclaimer, the term of this patent is extended or adjusted under 35 U.S.C. 154(b) by 159 days.

(21) Appl. No.: 13/390,684

(22) PCT Filed: Aug. 12, 2010

(86) PCT No.: PCT/EP2010/004957
§ 371 (c)(1),
(2), (4) Date: Feb. 15, 2012

(87) PCT Pub. No.: WO2011/020581
PCT Pub. Date: Feb. 24, 2011

(65) Prior Publication Data
US 2012/0148892 A1    Jun. 14, 2012

Related U.S. Application Data

(60) Provisional application No. 61/274,876, filed on Aug. 21, 2009.

(30) Foreign Application Priority Data

Aug. 18, 2009 (EP) .................................... 09010595

(51) Int. Cl.
*H01M 2/00* (2006.01)
*H01M 2/02* (2006.01)
*H01M 2/04* (2006.01)
*H01M 2/08* (2006.01)

(Continued)

(52) U.S. Cl.
CPC ............ *B32B 15/08* (2013.01); *B29C 45/14467* (2013.01); *B32B 1/02* (2013.01); *H01M 2/1072* (2013.01); *H01M 2/1094* (2013.01)

(58) Field of Classification Search
None
See application file for complete search history.

(56) References Cited

U.S. PATENT DOCUMENTS 3,900,640 A * 8/1975 Vecchiotti .................... 428/34.5
6,245,456 B1 * 6/2001 Fukuda et al. ................ 429/122

(Continued)

FOREIGN PATENT DOCUMENTS

CN    1314008 A    9/2001
DE    19529240    2/1997

(Continued)

OTHER PUBLICATIONS

Ticona Celanex 3310 Polyester (PBT) cut sheet.*

(Continued)

*Primary Examiner* — Yoshitoshi Takeuchi

(57) ABSTRACT

A housing suitable to comprise multiple electrical power cells in electrically driven motor vehicles comprises at least one lower receiving part and one upper covering part. Both parts fit together and create inside a hollow space. Both parts are prepared from a multilayered material comprising at least one support layer of thermoplastic polymer and at least one cover layer of metal adhering to each other. Such housing is perfectly suitable to protect the power cells inside against mechanical damage and against the influence of fire and/or electromagnetic radiation.

8 Claims, 2 Drawing Sheets

(51) Int. Cl.
　　*B32B 15/08*　　(2006.01)
　　*B29C 45/14*　　(2006.01)
　　*B32B 1/02*　　(2006.01)
　　*H01M 2/10*　　(2006.01)

(56) References Cited

U.S. PATENT DOCUMENTS

| 7,285,334 | B1 | 10/2007 | Yamashita et al. | |
|---|---|---|---|---|
| 2002/0164441 | A1* | 11/2002 | Amine et al. | 428/35.2 |
| 2009/0317708 | A1 | 12/2009 | Brandl et al. | |
| 2010/0075558 | A1 | 3/2010 | Muller et al. | |

FOREIGN PATENT DOCUMENTS

| EP | 0426638 | 10/1990 |
|---|---|---|
| EP | 0427697 | 10/1990 |
| EP | 1884353 | 7/2006 |
| JP | H11-31488 A | 2/1999 |
| JP | 2004-71168 A | 3/2004 |
| WO | WO 2008067949 A1 | 6/2008 |
| ZA | 9606747 | 2/1998 |

OTHER PUBLICATIONS

Rapra Technology Ltd, Metallocene Technology: A One-day Seminar, iSmithers Rapra Publishing (1997).*

* cited by examiner

HOUSING FOR ELECTRICAL POWER CELLS IN ELECTRICALLY DRIVEN AUTOMOTIVE VEHICLES

This application is the U.S. national phase of International Application PCT/EP2010/004957, filed Aug. 12, 2010, claiming priority to European Patent Application 09010595.8 filed Aug. 18, 2009, and the benefit under 35 U.S.C. 119(e) of U.S. Provisional Application No. 61/274,876, filed Aug. 21, 2009; the disclosures of International Application PCT/EP2010/004957, European Patent Application 09010595.8 and U.S. Provisional Application No. 61/274,876, each as filed, are incorporated herein by reference.

The present invention relates to a novel housing suitable to comprise multiple electrical power cells in electrically driven motor vehicles.

The invention further relates to a process for production of said housing.

Housings comprising multiple of electrical power cells in motor vehicles are usually necessary to protect the electrical power cells arranged inside from outside influences. Vice versa the housings are suitable, as well, to protect any persons sitting in the car from any influences originated from the electrical power cells inside the housing which may be overheated or subjected to leakage. Such housings are manufactured mainly from plastic material such as polyethylene or polypropylene by injection molding in different sizes and up to a volume of 1000 liters. Such housings have at the one side the advantage that they are electrically insulating and that they are light in weight. However, at the other side they have the disadvantage that their mechanically strength is poor and that they are flammable at high temperatures or in case of fire.

The object of the present invention was therefore to provide a new housing for multiple of electrical power cells in motor vehicles which is light in weight, however, which has in combination therewith higher mechanical strength and, thus, provides protection for the power cells comprised therein against mechanical damages and which is inflammable and which provides at least partially protection for the power cells comprised therein against the influence of electromagnetic radiation.

Figure 1:
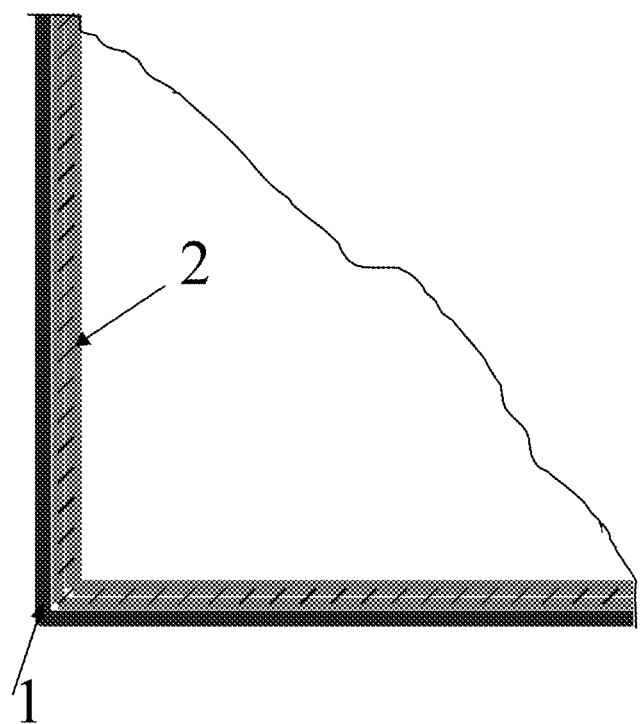
FIG. 1 shows a vertical cut through a part of a housing from side view having the cover layer of metal arranged at the outer side of the housing.

Said object is achieved by a housing as mentioned initially comprising at least one lower receiving part and one upper covering part which fit together and can be closed to create inside a hollow space and which are prepared from a multilayered material comprising at least one support layer of thermoplastic polymer and at least one cover layer of metal adhering to each other.

For the purpose of the instant invention the cover layer of metal may be arranged at the outer side of the housing or alternatively at the inner side of the housing. However, it is also possible to arrange the cover layer of metal either at the outer side of the housing and at the inner side of the housing.

Surprisingly, the multilayered material comprising at least a support layer of thermoplastic polymer and at least a cover layer of metal permits the preparation of a housing perfectly suitable to incorporate therein multiple electrical power cells as they are used for electrically driven motor vehicles. Such housing has nevertheless sufficient strength, especially also at large-surface area parts of the housing, such as the bottom, and also provides sufficient protection against immediate permeation of fire either from inside to outside or from outside to inside.

Surprisingly, it has been found that the stiffness of the housing can be markedly improved via lamination of the support layer with the cover layer of metal. For example, it is possible to achieve a stiffness level which hitherto has been unachievable via straight plastics-parts solutions for housing applications. A good example being a housing composed of acrylonitrile-butadiene-styrene copolymer (ABS) known for its high stiffness. This applies particularly to such areas where the housings have exposure to relatively high temperatures in the motor vehicle. The housing according to the instant invention leads to clear advantages here. The mechanical strength of the housing can be further improved, if the cover layer of metal is arranged on both sides of the support layer.

The mechanical properties of the housing can be varied further within a particularly wide range by way of controlled modification of the support layer of thermoplastic polymer, which can be impact-modified, provided with mineral fillers, or glassfiber-reinforced, and the mechanical properties can thus be matched to the requirements placed upon the housing, without any resultant effect on the surface properties and the surface quality of the housing parts, either the lower receiving part and the upper cover part.

The support layer composed of thermoplastic polymer can comprise, based in each case on the weight of the support layer, from 1 to 60% by weight, preferably from 5 to 50% by weight, particularly preferably from 10 to 40% by weight, of reinforcing fillers. Examples of these reinforcing fillers are barium sulfate, magnesium hydroxide, talc with average grain size in the range from 0.1 to 10 µm, measured to DIN 66 115, wood, flax, chalk, glass beads, coated glass fibers, short, long, or other glass fibers, or a mixture for these. The lower backing layer can moreover also comprise respectively advantageous amounts of further additives, e.g. light stabilizers, UV stabilizers, heat stabilizers, pigments, carbon blacks, lubricants, and processing aids, flame retardants, blowing agents, and the like. According to the invention, the lower backing layer itself is composed of thermoplastic polymers.

According to the invention, the thermoplastic polymers used with advantage for the support layer comprise polymers such as polypropylene (PP), polyethylene (PE), polyvinyl chloride (PVC), polysulfones, polyether ketones, polyesters, such as polyethylene terephthalate, polybutylene terephthalate or polyalkylene naphthalate, polycycloolefins, polyacrylates, polymethacrylates, polyamides, such as poly-epsilon-caprolactam or poly-hexamethyleneadipineamide or polyhexamethylenesebacineamide, polycarbonate, polyurethanes, polyacetals, such as polyoxymethylene (POM) or polystyrene (PS). Thermoplastic polymers principally suitable here are homopolymers and copolymers. In this connection, copolymers composed of propylene and ethylene or composed of ethylene or propylene and of other olefins having from 4 to 10 carbon atoms are particularly worthy of mention, as are co- or terpolymers composed of styrene and of relatively small proportions of butadiene, alpha-methylstyrene, acrylonitrile, vinylcarbazole, or esters of acrylic, methacrylic, or itaconic acid.

In order to improve the cost-effectiveness in production of the housing of the instant invention, its upper covering part can also comprise amounts of up to 60% by weight, based on the total weight of the upper covering part, of reclaimed materials recycled from the polymers mentioned.

According to the invention, the term polyoxymethylene (POM) means homo- and copolymers of aldehydes, such as formaldehyde or acetaldehyde, but preferably of cyclic acetals. A characteristic of POM is that there are constantly recurring carbon-oxygen bonds forming a distinctive feature of the molecular chain. The melt flow index (MI) of POM is usually in the range from 5 to 50 g/10 min, preferably from 5 to 30 g/10 min, measured to ISO 1133 at a temperature of 230° C. with a load of 2.16 kg.

If the intention is to use polyester for the support layer of the housing, materials clearly preferable for this purpose are polyethylene terephthalate (PET) or polybutylene terephthalate (PBT). Both are high-molecular-weight esterification products of terephthalic acid and ethylene glycol and, respectively, butylene glycol. According to the invention, the MI of particularly suitable polyesters is in the range from 5 to 50 g/10 min, preferably from 5 to 30 g/10 min, measured to DIN 1133 at a temperature of 230° C. with a load of 2.16 kg.

Copolymers of styrene that can be used for the support layer of the housing are in particular copolymers having up to 45% by weight, preferably having up to 20% by weight, of acrylonitrile within the polymer. The MI of these copolymers is typically in the range from 1 to 25 g/10 min, preferably from 4 to 20 g/10 min, measured to DIN 1133 at a temperature of 230° C. with a load of 2.16 kg.

Further terpolymers of styrene comprise up to 35% by weight, in particular up to 20% by weight, of acrylonitrile within the polymer and up to 35% by weight, preferably up to 30% by weight, of butadiene. The abbreviated term ABS is also used for these terpolymers, whose MI is typically in the range from 1 to 40 g/10 min, preferably from 2 to 30 g/10 min, measured to DIN 1133 at a temperature of 230° C. with a load of 2.16 kg.

Further thermoplastics used for the support layer of the housing are in particular polyolefins, such as polyethylene (PE) and polypropylene (PP), among which particular preference is given to use of PP. According to the invention, PP means homo- and copolymers of propylene. Copolymers comprise subordinate amounts of monomers copolymerizable with propylene, e.g. 1-olefins having 2 or 4 to 8 carbon atoms. If necessary, it is also possible to use two or more comonomers.

Thermoplastics which may be mentioned as particularly suitable for the support layer of the housing are homopolymers of propylene or copolymers composed of propylene and up to 50% by weight of further 1-olefins having up to 8 carbon atoms. These copolymers are normally random copolymers, but can also be block copolymers.

The polymerization reaction for production of PP can normally take place at a pressure in the range from 1 to 100 bar (from 0.1 to 10 MPa) in suspension or in the gas phase and in the presence of a Ziegler-Natta catalyst system. Preference is given here to catalyst systems which comprise not only a titanium-containing solid component but also co-catalysts in the form of organoaluminum compounds and electron-donor compounds.

Ziegler-Natta catalyst systems generally comprise a titanium-containing solid component, in particular halides or alcoholates of tri- or tetravalent titanium, and moreover a halogen-containing magnesium compound, inorganic oxides, such as silica gel, as support material, and electron-donor compounds. Particular electron-donor compounds that may be mentioned are carboxylic acid derivatives or ketones, ethers, alcohols, or organosilicon compounds.

The titanium-containing solid component can be prepared by known processes. It is preferably prepared by a process described in more detail in DE 195 29 240.

Co-catalysts suitable for the Ziegler-Natta catalyst systems are not only trialkylaluminum compounds but also compounds in which an alkyl group has been replaced by an alkoxy group or by a halogen atom, such as chlorine or bromine. The alkyl groups can be identical or different. Linear or branched alkyl groups can also be used. According to the invention, it is preferable to use trialkylaluminum compounds whose alkyl groups comprise from 1 to 8 carbon atoms, examples being triethylaluminum, triisobutylaluminum, trioctylaluminum, or methyldiethylaluminum, or a mixture thereof.

However, PP can also be produced in the presence of metallocene as catalyst. Metallocenes are complex compounds having a layered structure and comprising metals from the transition groups of the Periodic Table of the Elements plus organic, preferably aromatic, ligands. To permit their use for production of PP, the metallocene complexes are advantageously applied to a support material. Support materials which have proven advantageous are the inorganic oxides also used for preparation of the titanium-containing solid component in Ziegler-Natta catalysts.

Metallocenes usually used comprise, as central atom, titanium, zirconium, or hafnium, among which zirconium is preferred. The central atom has pi-bonding to at least one pi system, which is embodied by a cyclopentadienyl group. In the great majority of instances, the cyclopentadienyl group has additional substituents, which can be used to control the activity of the catalyst. Preferred metallocenes comprise central atoms bonded by way of two similar or different pi-bonds to two pi-systems, and these may also simultaneously be a constituent of appropriate heteroaromatic systems.

A suitable co-catalyst for the metallocene is in principle any compound which can convert the neutral metallocene to a cation and can stabilize the metallocene. Furthermore, as can be found in EP 427 697, the cocatalyst or the anion formed therefrom should not enter into any further reactions with the metallocenium cation formed. The cocatalyst used is preferably an aluminum compound and/or a boron compound.

The formula of the boron compound is preferably $R^{18}_x NH_{4-x} BR^{19}_4$, $R^{18}_x PH_{4-x} BR^{19}_4$, $R^{18}_3 CBR^{19}_4$, or $BR^{19}_3$, in which x is a number from 1 to 4, preferably 3, the radicals $R^{18}$ are identical or different, preferably identical, and are $C_1$-$C_{10}$-alkyl or $C_6$-$C_{18}$-aryl, or two radicals $R^{18}$ together with the atoms connecting them form a ring, and the radicals $R^{19}$ are identical or different, preferably identical, and are $C_6$-$C_{18}$-aryl, which can be alkyl, haloalkyl, or fluorine substituted. In particular, $R^{18}$ is ethyl, propyl, butyl, or phenyl, and $R^{19}$ is phenyl, pentafluorophenyl, 3,5-bistrifluoromethylphenyl, mesityl, xylyl or tolyl. EP 426 638 describes boron compounds as cocatalyst for metallocenes.

It is preferable that the co-catalyst used is an aluminum compound, such as alumoxane and/or an alkylaluminum compound.

It is particularly preferable that the co-catalyst used is an alumoxane, in particular of linear type or of cyclic type, and in both of the compounds here there can also be organic radicals present which are identical or different and can be hydrogen or a $C_1$-$C_{20}$-hydrocarbon group, such as a $C_1$-$C_{18}$-alkyl group, a $C_6$-$C_{18}$-aryl group, or benzyl.

The support layer of the housing together with the cover layer of metal can take the form of injection-molded, extruded, or compression-molded sheet in various thicknesses and sizes. Preferred layer thicknesses for the support layer are in the range from 1 to 20 mm, particularly preferably from 2 to 15 mm.

For the cover layer of metal different metals are useful. Thus, aluminum is very suitable, but also iron is useful or noble metals like silver or chromium, whereby aluminum, iron or chromium are preferred. The thicknesses of the cover layer of metal is in the range of 50 to 1000 μm, preferably in the range of from 70 to 500 μm.

In a preferred embodiment of the invention, an additional intermediate layer may be arranged between the support layer of thermoplastic polymer and the cover layer of metal to improve the adhesion strength of the two layers. A particular material that can be used for the intermediate layer is a thermoplastic polymer, preferably the same thermoplastic polymer as that used for the support layer. This combination can produce a particularly firmly adhering bond between the support layer and the cover layer of metal. According to the invention, the intermediate layer is in the form of a thin web or else, preferably a thin nonwoven, with thickness in the range from 0.001 to 1 mm, preferably from 0.005 to 0.5 mm.

One thermoplastic material preferably used for the intermediate layer is a PP which has been produced in the presence of metallocene as catalyst and whose MI is in the range from 10 to 60 g/10 min, measured to DIN 1133 at a temperature of 230° C. with a load of 2.16 kg.

The intermediate layer composed of thermoplastic polymer can also with high advantage be a resin-saturated nonwoven. Acrylate resins, phenolic resins, urea resins, or melamine resins may in particular be used here as saturating resin. The degree of saturation with resin here can be up to 300%, and this means that practically the entire surface of the intermediate layer has been heavily saturated with resin, which then amounts to 300% of the weight of the intermediate layer without resin. The degree of saturation with resin is preferably from 15 to 150%, particularly preferably from 80 to 120%. According to the invention, the weight of the intermediate layer is in the range from 15 to 150 g/m$^2$, preferably from 30 to 70 g/m$^2$.

The invention also provides a process for production of the housing by the technique of reverse coating by an injection-molding method. In order to bond the support layer and the intermediate layer and the cover layer of metal to give a firmly adhering multilayered composite, the initial charge in the technique of reverse coating by an injection-molding method places the material for the intermediate layer and the cover layer of metal on one of the sides into one half of an injection mold, and, where desired, the material for an intermediate layer and another cover layer of metal on the other side into the other half of the injection mold. Once the mold has been closed, the thermoplastic polymer is injection-molded at a temperature in the range from 150 to 330° C. and at high pressure of from 5 to 2500 bar (=from 0.5 to 250 MPa) into the compartment between the intermediate layers which are present on each side. The mold temperature is generally from 8 to 160° C. on each side. Once the thermoplastic has been injected under the conditions stated, the mold is cooled to ambient temperature. The cooling time for this is in the range from 0.01 to 5.0 min.

In another version of the process, a prefabricated laminate comprising the intermediate layer and a metal foil whose layer thickness is in the range from 0.02 to 20 mm or, as an alternative to this, individual foils (overlay, metal, resin) are first laminated to a nonwoven (about 30 g/m$^2$; metallocene polymer, ®Novolen). Material for a further prefabricated laminate is then prefabricated with the desired thickness and shape. The two variants are then placed in the respective opposite mold halves of an injection-molding compartment, the mold is closed, and then the thermoplastic is injected using a temperature of at least 170° C. and a pressure of at least 50 bar (5 MPa) between these, into the compartment.

The procedure that takes place in compression molding is in principle the same. The single difference is that the thermoplastic polymer for the support layer is introduced in the form of pellets between the individual foils inserted in the layer sequence, and is exposed to pressure of at least 5 bar and to a press temperature of at least 100° C. on each side, for a press time period of at least 30 sec.

The same procedure has proven outstandingly successful in practice with injection-compression molding and transfer molding.

According to the instant invention the housing for the electrical power cells comprises inside a volume of in the range of from at least 1 liter up to about 1000 liters in maximum, preferably from 1.5 liters to about 800 liters. The lower receiving part and the upper covering part of the housing fit thereby together like tongue and groove joint and are connected with each other by screwing both parts together or clamping them together. For many applications it is, however, also appropriate to seal both parts together by heat sealing or welding or by some kind of hot melt, to render the connection gas tight and liquid tight.

In order to provide even clearer explanation of the invention for the person skilled in the art, the drawings attached show in detail the principle of the housing in the structure of, and during production of, various housings for electrical power cells in electrically driven motor vehicles.

FIG. 1 shows a vertical cut through a part of a housing from side view having the cover layer of metal arranged at the outer side of the housing.

Reference numerals indicate where the cover layer of metal 1 is to see comprising an aluminum foil and where the support layer 2 of talcum reinforced PP is to see.

Figure 2:
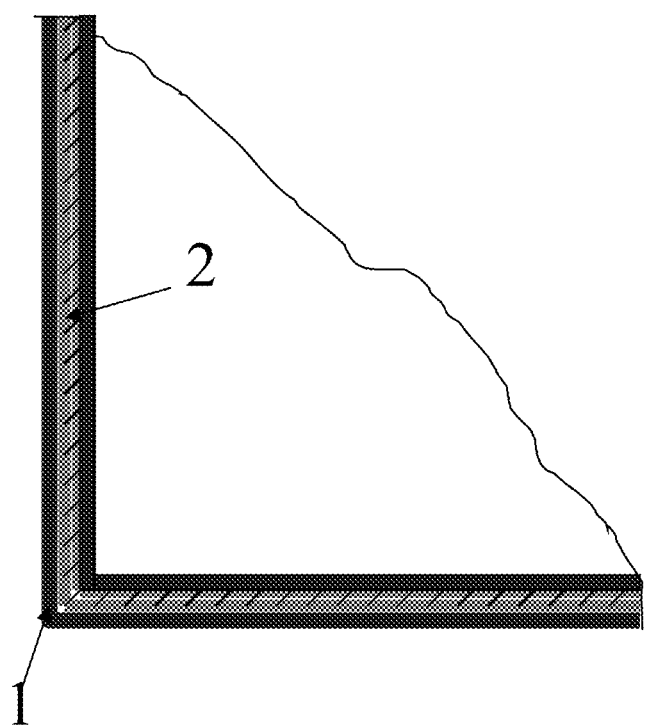
FIG. 2 shows another vertical cut through another version of the housing in sandwich structure, in side view. This version uses a support layer having arranged cover layers on both sides.

FIG. 2 shows another vertical cut through another version of the housing in sandwich structure in side view. This version using a support layer having arranged cover layers on both sides.

The reference numerals in FIG. 3 indicate the support layer 2 comprising PP and covered on both sides with cover layers 1 containing aluminum foils.

The invention claimed is:

1. A battery housing for electrically-driven motor vehicles comprising:
   (a) a support layer, wherein the support layer has a thickness is in the range from 1 to 20 mm, and wherein the support layer comprises:
      (i) 40 to 99%, based on the total weight of the support layer, of a thermoplastic polymer, and
      (ii) 1 to 60%, based on the total weight of the support layer, of a reinforcing filler;
   (b) a cover layer, wherein the cover layer comprises a metal having a thickness from 50 to 1000 μm, and wherein the cover layer comprises metals selected from the group consisting of aluminum, iron, a noble metal, silver, and chromium;
   (c) an intermediate layer directly contacting both the support layer and the cover layer, said intermediate layer has a thickness of 0.005 mm to 0.5 mm, wherein the intermediate layer is saturated with a resin such that the weight of the intermediate layer is in the range of 30 to 70 g/m$^2$, and wherein said resin is selected from the group consisting of acrylate resins, phenolic resins, urea resins, and melamine resins.

2. The housing of claim 1, wherein the thermoplastic polymer is selected from the group consisting of: polypropylene (PP), polyethylene (PE), polyvinyl chloride (PVC), polysulfones, polyether ketones, polyesters, polycycloolefins, polyacrylates, polymethacrylates, polyamides, polycarbonates, polyurethanes, polyacetals, and a combination thereof.

3. The housing of claim 1, wherein the reinforcing filler is barium sulfate having an average grain size from 0.1 to 10 µm, magnesium hydroxide having an average grain size from 0.1 to 10 µm, talc having an average grain size from 0.1 to 10 µm, wood, flax, chalk, glass beads, coated glass fibers, glass fibers, or a combination thereof.

4. The housing of claim 1, wherein the support layer is an injection-molded, extruded or compression-molded sheet.

5. The housing of claim 2, wherein the polyesters are selected from polyethylene terephthalate, polybutylene terephthalate or polyalkylene naphthalate, the polyamides are selected from polyepsilon-caprolactam, polyhexamethyleneadipineamide or polyhexa-methylenesebacineamide, and the polyacetals are selected from polyoxymethylene (POM) or polystyrene (PS).

6. The housing of claim 1, wherein the support layer comprises 5 to 50% by weight, based on the weight of the support layer, of the reinforcing filler.

7. The housing of claim 6, wherein the support layer comprises 10 to 40% by weight, based on the weight of the support layer, of the reinforcing filler.

8. The housing of claim 4, wherein the thickness of the support layer is in the range from 2 to 15 mm.

* * * * *